United States Patent
Lin et al.

(10) Patent No.: US 8,340,591 B2
(45) Date of Patent: Dec. 25, 2012

(54) SCHEDULING METHODS AND SYSTEMS FOR MULTI-HOP RELAY IN WIRELESS COMMUNICATIONS

(75) Inventors: Shiang-Jiun Lin, Nantou (TW); I-Kang Fu, Hsinchu (TW); Cheng-Kang Pai, Sindian (TW); Wern-Ho Sheen, Minsyoung Township (TW)

(73) Assignee: Acer Inc., New Taipei (TW)

( * ) Notice: Subject to any disclaimer, the term of this patent is extended or adjusted under 35 U.S.C. 154(b) by 1113 days.

(21) Appl. No.: 12/205,989

(22) Filed: Sep. 8, 2008

(65) Prior Publication Data

US 2009/0286465 A1    Nov. 19, 2009

Related U.S. Application Data

(63) Continuation-in-part of application No. 12/121,749, filed on May 15, 2008, now Pat. No. 7,953,374.

(51) Int. Cl.
  *H04B 17/00* (2006.01)
(52) U.S. Cl. .......... 455/67.13; 455/7; 455/9; 455/67.11; 370/315
(58) Field of Classification Search .................. 455/7, 9, 455/67.11, 67.13; 370/315
  See application file for complete search history.

(56) References Cited

U.S. PATENT DOCUMENTS
2009/0003260 A1* 1/2009 Guo et al. ...................... 370/315

FOREIGN PATENT DOCUMENTS
| JP | 2007-258844 | 10/2007 |
| JP | 2007-306572 | 11/2007 |
| JP | 2008-092580 | 4/2008 |
| JP | 2008-118660 | 5/2008 |
| WO | WO 03/058984 A2 | 7/2003 |

OTHER PUBLICATIONS

"Office Action of Japan Counterpart Application" issued on Jul. 23, 2010, p. 1-p. 3.
European Search Report dated Oct. 2, 2008, in related European Application No. 06127342.1.

* cited by examiner

*Primary Examiner* — Raymond Dean
(74) *Attorney, Agent, or Firm* — Jianq Chyun IP Office

(57) ABSTRACT

A wireless communication system includes one or more base stations, which may include one or more antennas for signal communications; a transceiver device, and a communication control device. The transceiver device is configured to communicate with a first group of relay stations being configured to receive and relay a first group of wireless communication signals from at least one base station and a second group of relay stations being configured to receive and relay a second group of wireless communication signals from at least one base station. The communication control device is configured to control one or both of (1) signal transmission power of at least one antenna and (2) signal communication timing of at least one antenna. The communication control device is also configured to divide a service period of the antenna into multiple phases, to enable communication of signals directed toward or from the first group of relay stations in a first phase, and to enable the second group of relay stations to communicate signals with one or both of the user device and the base station, during at least a part of the first phase, independently from the signals directed toward or from the first group of relay stations.

20 Claims, 14 Drawing Sheets

SCHEDULING METHODS AND SYSTEMS FOR MULTI-HOP RELAY IN WIRELESS COMMUNICATIONS

PRIORITY AND CROSS-REFERENCE TO RELATED APPLICATION

This application is a continuation-in-part application of and claims priority from U.S. patent application Ser. No. 12/121,749 entitled "Scheduling Methods and Systems for Wireless Multi-Hop Relay Communications" and filed May 15, 2008 now U.S. Pat. No. 7,953,374.

TECHNICAL FIELD

The present invention relates to scheduling methods and systems for multi-hop relay in wireless communications. More specifically, the invention relates to grouping relay stations in a wireless, multi-hop communication system.

BACKGROUND

Modern and future mobile communication systems are designed to provide high-speed, high link-quality, or high security transmissions. They may also support various communication needs, services, or protocols. An effective resource schedule or allocation method may be needed to meet various quality of service (QoS) requirements for different users at different locations. For example, users located at cell boundaries or boundaries of wireless transmissions may have reduced link quality, and users in a cell with a severe shadowing effect may also have a reduced link quality. Without an effective resource schedule or allocation, the reduced link quality may prevent users from having high data-rate transmissions.

One way to resolve the problem is to increase the density of base stations or to place more base stations at areas with severe shadowing or less desirable link quality. This approach may increase costs or require additional equipment or hardware. As an alternative, the transmission power of a base station may be increased to improve link quality, but the approach may increase transmission costs, signal interference, or both.

As another alternative, a multi-hop relay cell architecture may be implemented, which may solve some of the problems in some applications when considering factors such as QoS, deployment costs, transmission power, and coverage areas of cells. Relay stations may be deployed within a cell to relay information from a base station to users or mobile stations. In some applications, the use of relay stations may improve cell coverage, user throughput, system capacity, or any combination of them compared to other alternatives. For example, relay stations may be deployed at areas with severe shadowing, areas near cell boundaries, areas not very well served by base stations, or areas with less desirable link quality. The relay stations therefore may better serve those areas by providing improved link quality and extend the effective coverage of the base stations.

A single link with less desirable quality may be divided into a plurality of links with better quality to enable each link to provide higher transmission rates. However, because the same data may be duplicated and relayed over the air multiple times for multi-hop transmissions, it needs extra radio resources for the extra hop(s) of data transmission. Without a proper scheduling mechanism, it may consume more radio resources than a single-hop system.

In a multi-hop communication system, there may be a base station and several relay stations in a cell. To efficiently utilize the radio resource and to improve the spectrum efficiency, multiple serving stations may be active simultaneously if the interference level is acceptable. For example, the interference may include (1) the potential interference between serving stations (base station and/or relay stations) transmitting at the same time within the same cell is acceptable, (2) the interference from these transmitting serving stations to other cells, or both (1) and (2).

To obtain benefits for multi-hop relay communication systems, there may be a need for a scheduling mechanism for the transmissions of base stations and relay stations. As an example for improving the performance of a wireless communication system, a method of relay stations deployment in a Manhattan-like environment was provided in the Wireless World Initiative New Radio (WINNER) program. The Manhattan-like environment is a grid environment in which the width of blocks is about 200 meters (m) and the width of streets is about 30 m. FIG. 1 is a diagram illustrating a layout of a base station 205 and a plurality of relay stations 201 to 204 in a single cell under a Manhattan-like environment. Referring to FIG. 1, base station 205 and relay stations 201 to 204 may be placed within the single cell. Base station 205 and relay stations 201 to 204 may communicate with users through omni-directional antennas. However, because relay stations 201 to 204 may be outside coverage area 206 of base station 205, each of relay stations 201 to 204 may require an additional directional antenna pointing at base station 205 for communicating with base station 205. This requirement may increase the hardware cost of relay stations.

FIG. 2 is a diagram illustrating the transmission scheduling of a frame structure applicable to the first layout shown in FIG. 1 within a single cell. Referring to FIG. 2, frame S301 may be divided into two sub-frames S302 and S303. The first sub-frame 5302 may be further divided into 5 time slots S304 to S308. Base station 305 may serve four relay stations 301 to 304 during the first four time slots S304 to S307, respectively. During the fifth time slot S308, base station 305 may serve users within area 306, which may directly communicate with base station 305. The second sub-frame S303 may be divided into two time slots S309 and S310, and with the characteristics of spatial separation of the environment, relay stations 301 and 302 may respectively serve their corresponding users within two areas 307 and 308 during the first time slot S309, and relay stations 303 and 304 may respectively serve their corresponding users within areas 309 and 310 during the second time slot S310.

FIG. 3 is a diagram illustrating a layout of base stations 405, 415 and relay stations 401 to 404, 411 to 414 in a multi-cell structure in the Manhattan-like environment illustrated in FIG. 2. Referring to FIG. 3, coverage area 406 of single cell A and coverage area 416 of single cell B are arranged in a staggered manner. Moreover, base stations 405 and 415 in FIG. 4 represent the locations of the base stations in single cell A and single cell B. Relay stations 401 to 404 belong to single cell A, and relay stations 411 to 414 belong to single cell B.

FIG. 4 is a diagram illustrating transmission scheduling for a frame structure applicable to the layout shown in FIG. 3 within the multi-cell structure in the Manhattan-like environment. Referring to FIG. 4, an arrangement of transmission frames between adjacent cells may be used to vary or adjust the operation orders of sub-frames S502 and S503 in frame S501 so that the interference between cells may be reduced. These relay stations may extend the coverage area of the base station. However, the link quality of users at the service range boundary of the base station may have no or limited improvement. Moreover, all of the base stations may have idle time within the periods of frame transmissions. Because base stations may be the only serving stations connected to the backhaul networks and transmitting effective data, the transmission efficiency of the base stations in this design may less desirable.

FIG. 5 is a diagram illustrating a second layout of base station 605 and four relay stations 601 to 604 with omni-directional antennas in a Manhattan-like environment. Referring to FIG. 5, base station 605 and relay stations 601 to 604 may all communicate with users by using omni-directional antennas. Because relay stations 601 to 604 are placed within coverage area 606 of base station 605, additional directional antenna might not be needed by each of relay station 601 to 604 for communicating with base station 605. With this design, the link quality of users in the cell boundary may be improved.

FIG. 6 is a diagram illustrating transmission scheduling for a frame structure applicable to the second layout shown in FIG. 5 with all serving stations equipped with omni-directional antennas in the Manhattan-like environment. Referring to FIG. 6, base station 705 may serve four relay stations 701 to 704 sequentially during first four time slots S701 to S704, and at the same time, base station 705 may serve users directly connected to base station 705. Relay stations 701 and 703 may respectively serve their corresponding users during the time slot S705. After that, relay stations 702 and 704 may respectively serve their corresponding users during the next time slot S706. This layout may improve the link quality of users at the cell boundary. However, a complete transmission within a single cell may require at least 6 phases. When considering the multi-cell structure, because of the use of omni-directional antennas, the reuse factor of at least 2 may be required to avoid severe inter-cell interference, thereby decreasing the overall system capacity.

Under the different layout of base and relay stations, all the base stations and the relay stations may still idle for some time in the frame structure. Accordingly, the transmission efficiency may be undesirable. Therefore, there may be a need for systems or methods for multi-hop relay in wireless communications systems that may provide alternative implementations or applications. The disclosed embodiments may overcome or be configured to overcome one or more of the problems set forth above.

SUMMARY OF THE INVENTION

In one exemplary embodiment, the present disclosure is directed to a wireless communication system that includes at least one base station being configured to communicate with at least one user device through at least one relay station. The base station includes at least one antenna for signal communications; a transceiver device, and a communication control device. The transceiver device is configured to communicate with a first group of relay stations being configured to receive and relay a first group of wireless communication signals from at least one base station and a second group of relay stations configured to receive and relay a second group of wireless communication signals from at least one base station. The communication control device is configured to control at least one of (1) signal transmission power of at least one antenna and (2) signal communication timing of at least one antenna. The communication control device is also configured to divide a service period of the antenna into multiple phases, to enable communication of signals directed toward or from the first group of relay stations in a first phase, and to enable the second group of relay stations to communicate signals with one or both of the user device and the base station, during at least a part of the first phase, independently from the signals directed toward or from the first group of relay stations.

In another exemplary embodiment, the present disclosure is directed to a wireless communication system that includes a first group of relay stations being configured to receive and relay a first group of wireless communication signals; a second group of relay stations being configured to receive and relay a second group of wireless communication signals; and at least one base station being configured to communicate with the first group of relay stations and the second group of relay stations. The relay stations in the first and second groups are divided into groups based on at least a potential interference among the relay stations within the same cell and from other serving station in at least one co-channel cell. The base station includes at least one antenna for signal communications and a communication control device, which is configured to control at least one of (1) the signal transmission power of and (2) the signal communication timing of at least one antenna. The communication control device is further configured to divide a service period of the antenna into at least two phases, to enable communication of signals directed toward or from the first group of relay stations in a first phase, and to enable the second group of relay stations to communicate signals, during at least a part of the first phase, independently from the signals directed toward or from the first group of relay stations.

In still another exemplary embodiment, the present disclosure is directed to a wireless communication method. The method includes: establishing communication with a plurality of relay stations being configured to receive and relay wireless communication signals from the at least one base station; dividing the relay stations in a first and a second group based on at least a potential interference among at least some of the relay stations; dividing a service period of at least one antenna of the at least one base station into multiple phases; and controlling at least one of (1) signal transmission power of at least one antenna of the at least one base station and (2) signal communication timing of the at least one antenna to enable communication of signals directed toward or from the first group of relay stations in a first phase, and to enable the second group of relay stations to communicate signals, during at least a part of the first phase, independently from the signals directed toward or from the first group of relay stations. The first group of relay stations are configured to receive and relay a first group of wireless communication signals from the at least one base station, and the second group of relay stations are configured to receive and relay a second group of wireless communication signals from the at least one base station. In some exemplary embodiments, the first group of relay stations and the second group of relay stations may have an overlap in the coverage area of the first group of relay stations and the coverage area of the second group of relay stations.

DETAILED DESCRIPTION

The disclosed embodiments may be applied to various layouts of base stations, relay stations, or both. For simplicity in descriptions and illustrational purposes, the following exemplary embodiments are described with a Manhattan-like environment. The embodiments may be implemented in any other environment according to the same or similar concept described below. In a Manhattan-like environment or certain other environments, the interference level may be weakened by spatial separation, such as one produced by the shadowing effect of surrounding buildings, and the grouping of relay stations may be altered accordingly.

Figure 1:
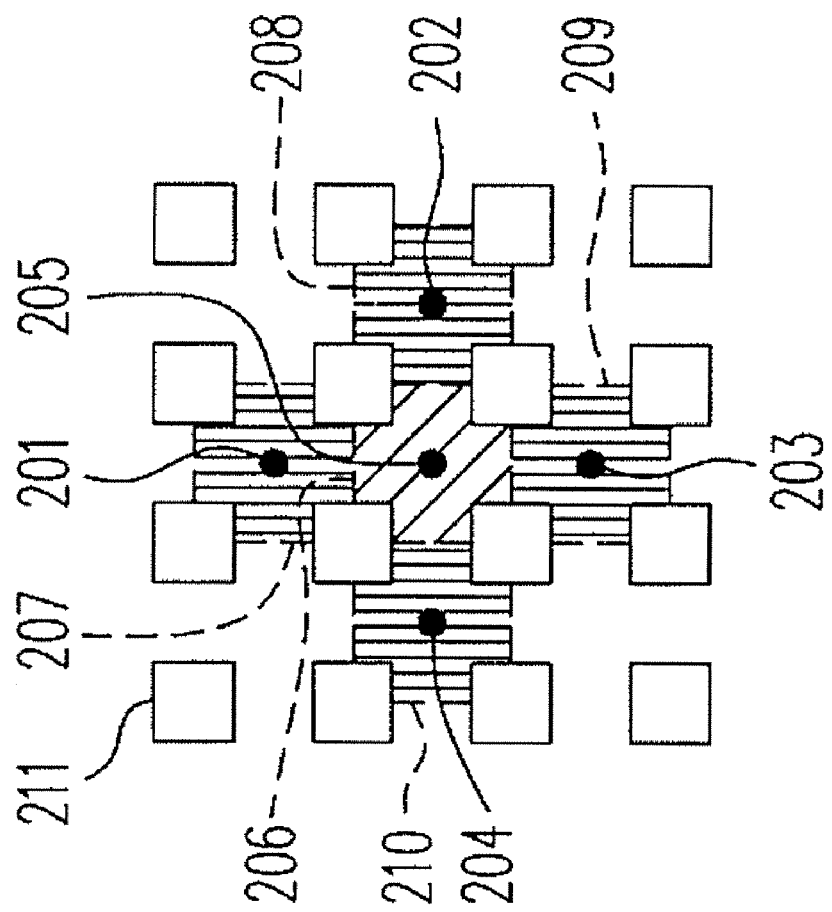
FIG. 1 is a diagram illustrating a layout of a base station and a plurality of relay stations of a single cell in a Manhattan-like environment in a communication system in the prior art.
Figure 2:
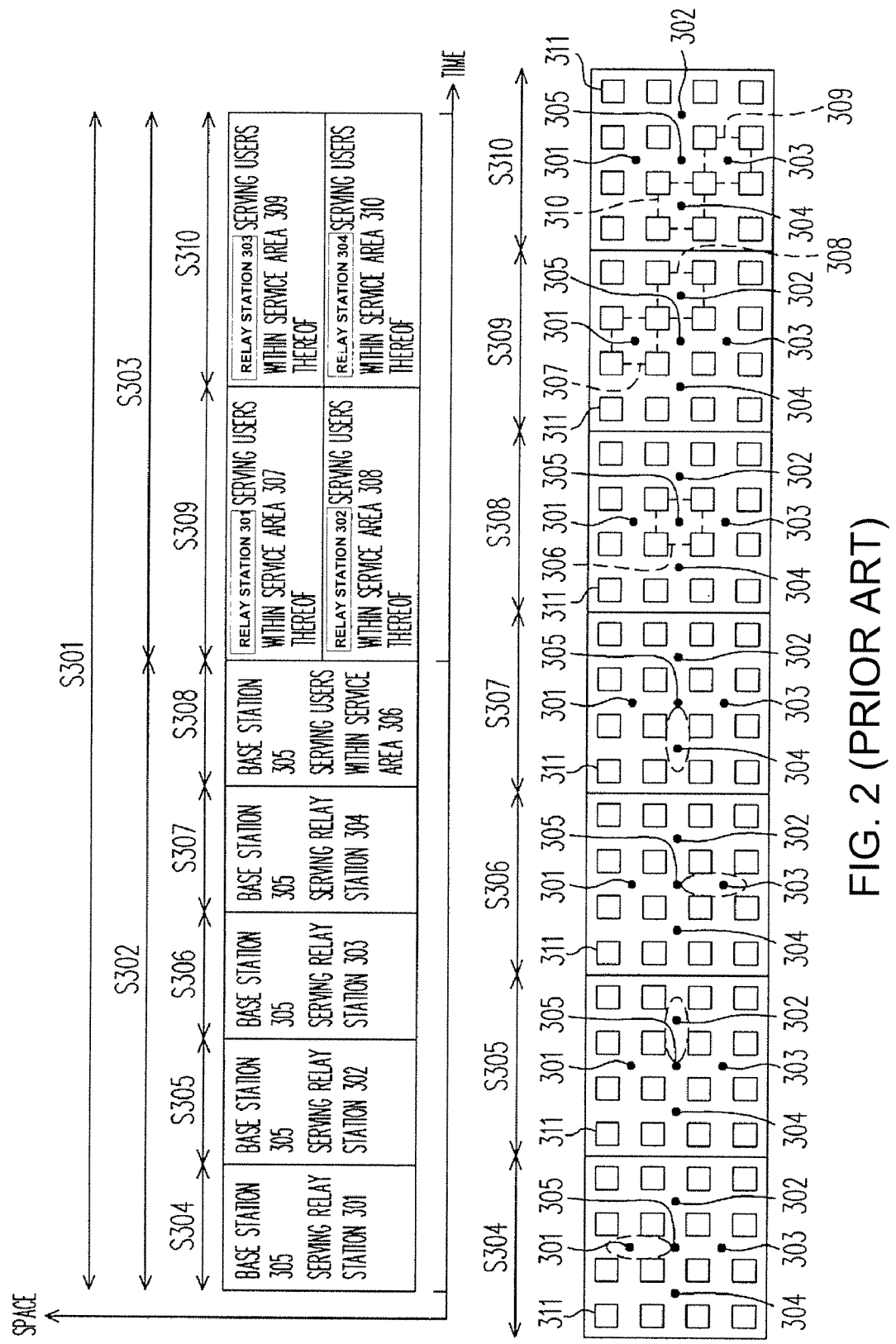
FIG. 2 is a diagram illustrating transmission scheduling for a frame structure applicable to the layout shown in FIG. 2 in the prior art.
Figure 3:
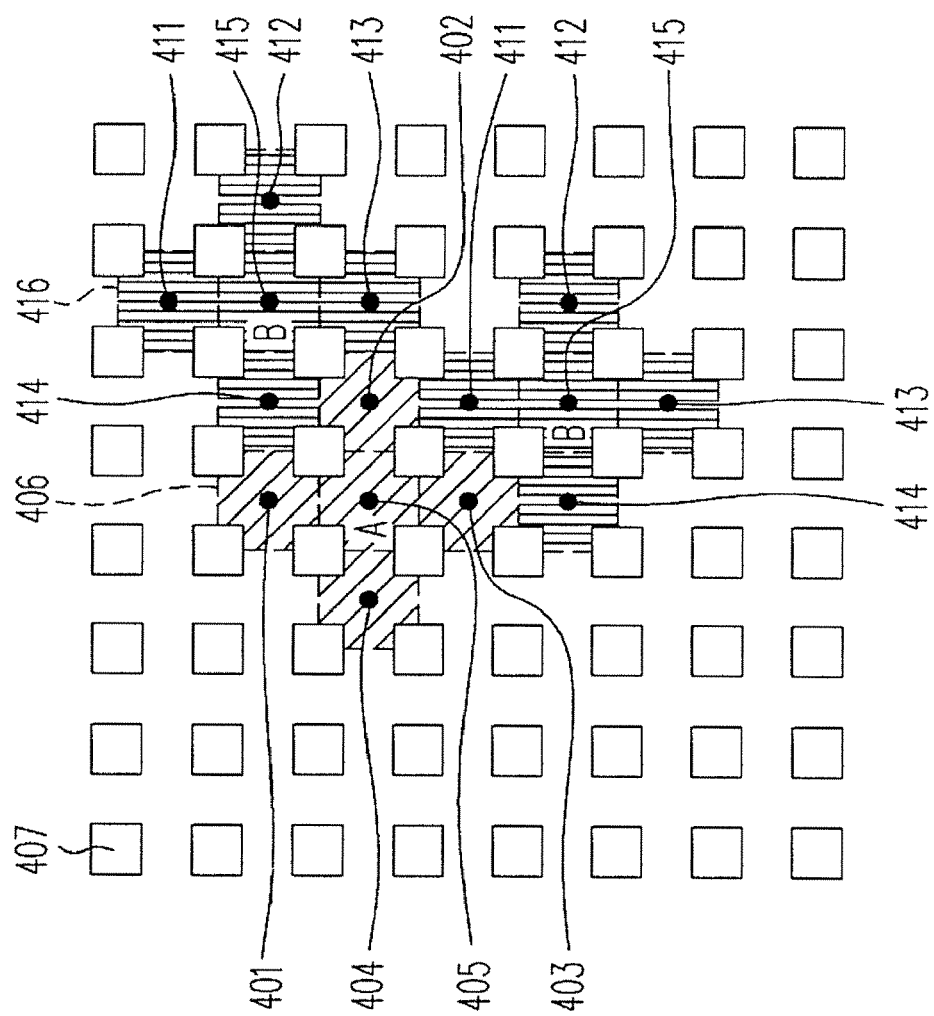
FIG. 3 is a diagram illustrating a layout of base stations and relay stations in a multi-cell structure in a Manhattan-like environment illustrated in FIG. 2 in the prior art.
Figure 4:
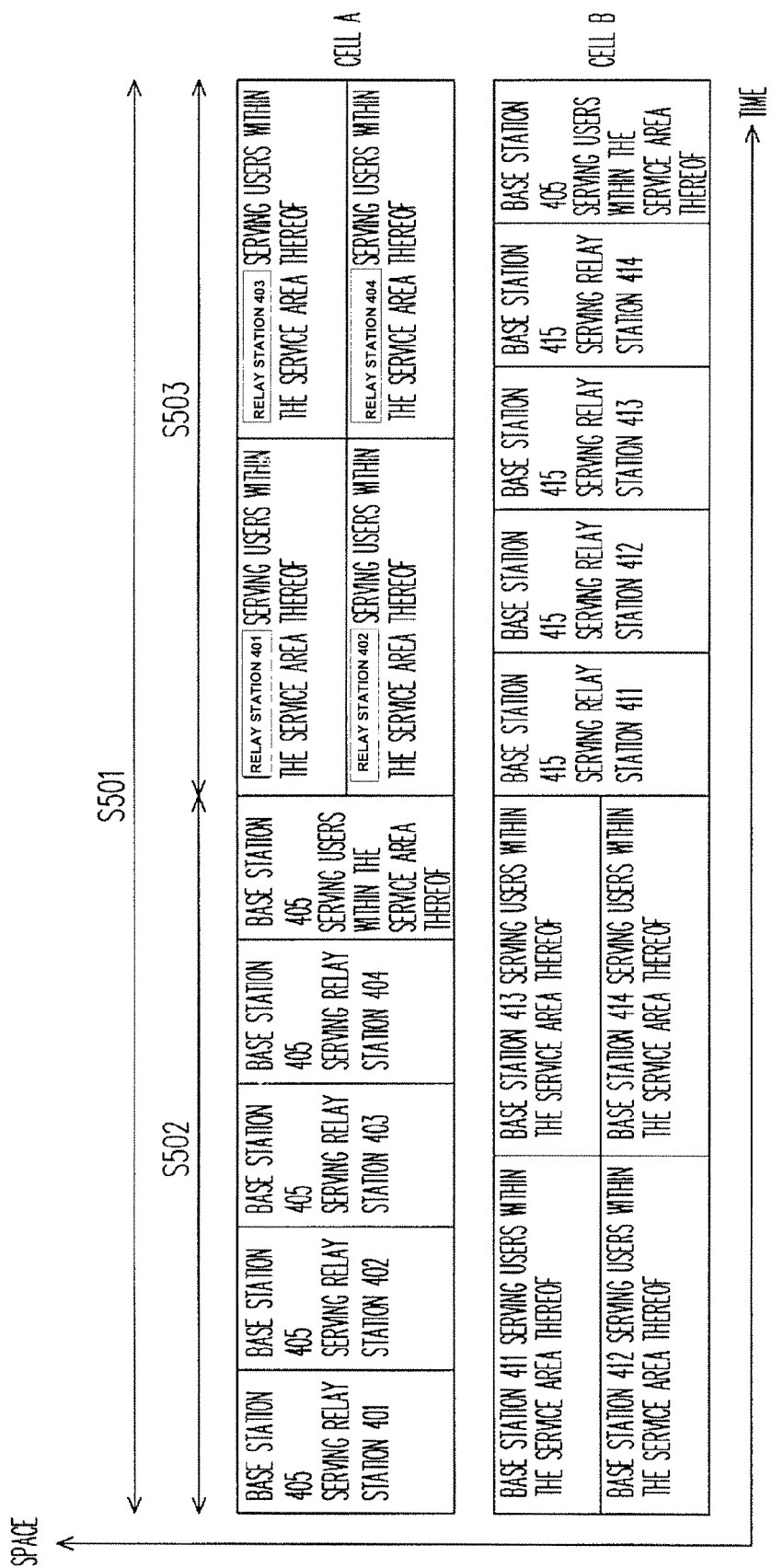
FIG. 4 is a diagram illustrating transmission scheduling for a frame structure applicable to the layout shown in FIG. 3 within the multi-cell structure in a Manhattan-like environment in the prior art.
Figure 5:
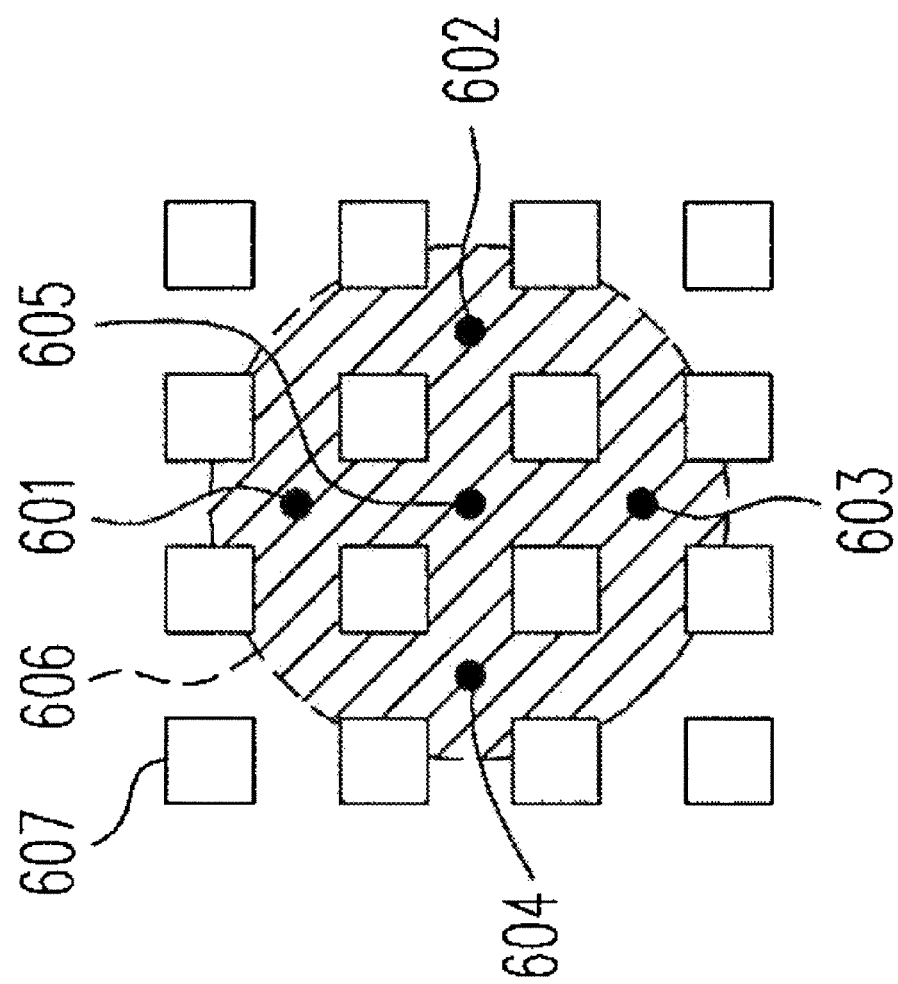
FIG. 5 is a diagram illustrating a second layout of a base station and four relay stations with omni-directional antennas in a Manhattan-like environment in the prior art.
Figure 6:
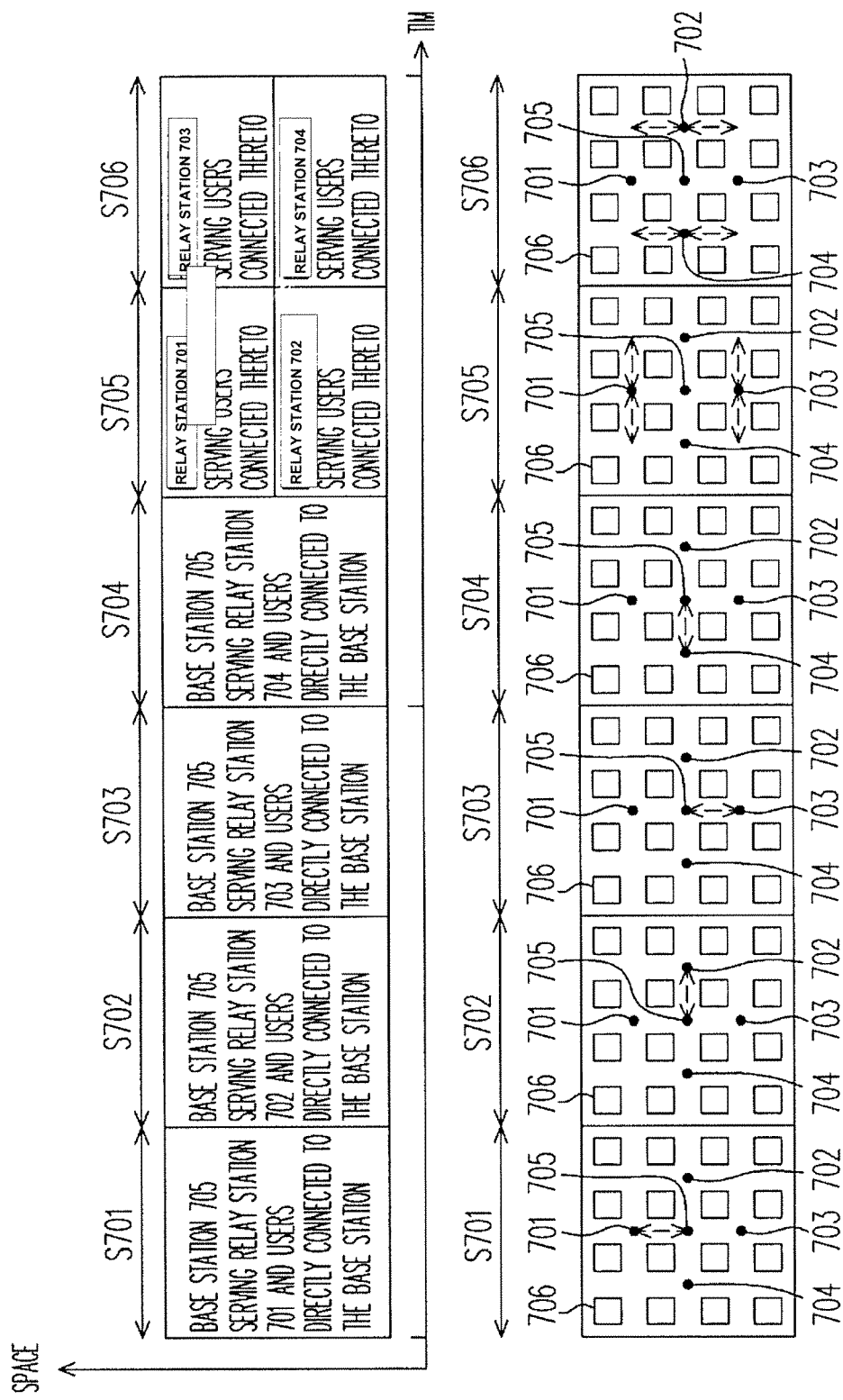
FIG. 6 is a diagram illustrating transmission scheduling for a frame structure applicable to the layout shown in FIG. 5 in the prior art.
Figure 7:
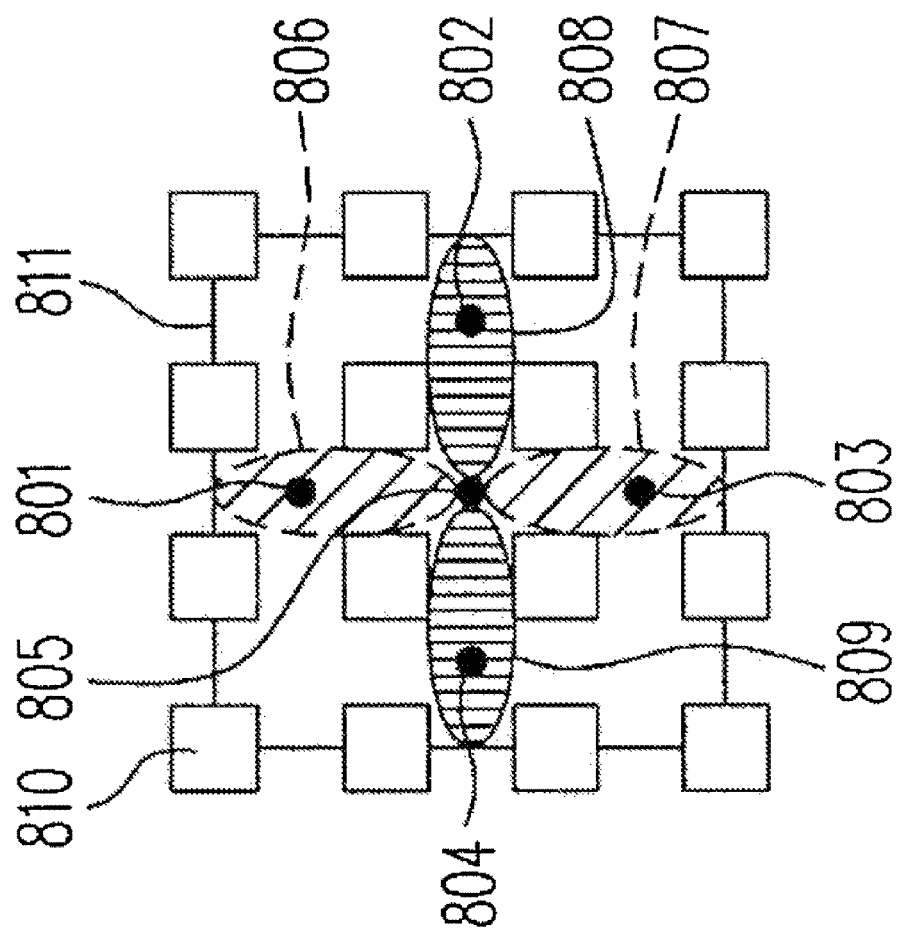
FIG. 7 is an exemplary diagram illustrating a layout of a base station and a plurality of relay stations in a Manhattan-like environment consistent with certain disclosed embodiments.

FIG. 7 is a diagram illustrating a layout of base station 805 and a plurality of relay stations 801 to 804 in a Manhattan-like environment consistent with certain disclosed embodiments. Referring to FIG. 7, a microcell may cover 690*690 square meters in one embodiment, and base station 805 may be at a crossroad. Four relay stations 801, 802, 803 and 804 may be placed at certain intersections located outside base station 805, such as the four intersections immediately outside where base station 805 is. As an example, relay stations 801 to 804 may be placed at the intersection of one street having a line of sight (LOS) of base station 805 and another street having non-line of sight (NLOS) of base station 805.

In one embodiment, base station 805 may use four directional antennas or a four-sector antenna for transmitting data to one or both of (1) users on or near the streets in four directions and (2) relay stations 801 to 804. Relay stations 801 to 804 may use two directional antennas or two-sector antennas for data transmission to users within the NLOS (or outside the LOS) of base station 805. Base station 805 and relay stations 801 to 804 may serve all users within a cell coverage area 811. In one embodiment, users within the LOS of base station 805 may have single-hop links to base station 805, while users outside the LOS of base station 805 may establish multi-hop links to base station 805 through one or more relay stations, such as relay stations 801 to 804.

Figure 8:
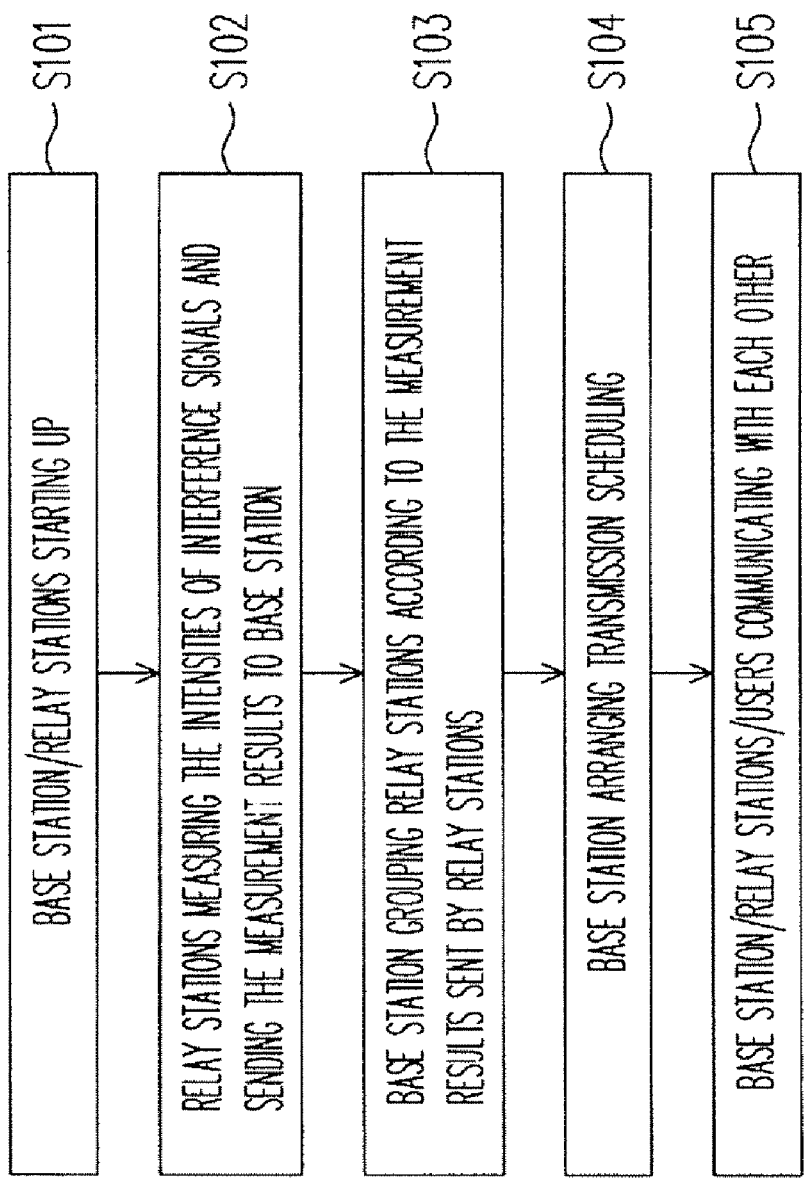
FIG. 8 is an exemplary flow chart illustrating a scheduling method of a wireless multi-hop relay communication system consistent with certain disclosed embodiments.

FIG. 8 is an exemplary flow-chart illustrating a scheduling method for a wireless multi-hop relay communication system consistent with certain disclosed embodiments. Referring to FIG. 8, after starting up base station 805 and relay stations 801 to 804 at step S101, one or more of relay stations 801 to 804 may measure the interference level from other relay stations and base stations at step S102. In some embodiments, the interference level or potential interference level may be obtained by observing or processing a data signal or a reference signal transmitted by the relay stations and base stations. The data signal or the reference signal may include a preamble with a preamble index, which may be used to measure or may contain the signal strength of the wireless multi-hop relay communication system. Alternatively, the potential interference level may be measured by observing or determining factors such as a signal-to-interference-and-noise-ratio (SINR), a carrier-to-interference-and-noise-ratio (CINR), and a received signal strength indicator (RSSI) of the data signal or the reference signal.

At step S103, relay stations 801 to 804 may report the measurement results back to base station 805. Base station 805 may then divide relay stations 801 to 804 into groups based on the results. Base station 805 may divide relay stations that may affect each other or have interference that may potentially go beyond certain thresholds and divide them into different groups. For example, relay stations 801 and 803 may be put into group A, while relay stations 802 and 804 may be put into group B. As a result, the stations within a group may have less likelihood of interfering with each other when some or all of them are transmitting signals at the same time. In another embodiment, if the transmission target of one of relay stations 801 to 804 is another relay station and the target relay station is not capable of receiving and transmitting data at the same time, the two relay stations may be put into different groups. Moreover, because the number of groups may be related to the number of phases in transmission scheduling, and may therefore influence the efficiency of utilization of the communication system, the number of groups may be kept as small as possible in some embodiments.

At step S104, base station 805 may arrange transmission schedules for relay stations 801 to 804 after they are grouped. In one embodiment, the number of groups may become the number of phases in a service period for the transmission scheduling. Subsequently, at step S105, base station 805, relay stations 801 to 804, and the users may start to communicate with one another.

Figure 9A:
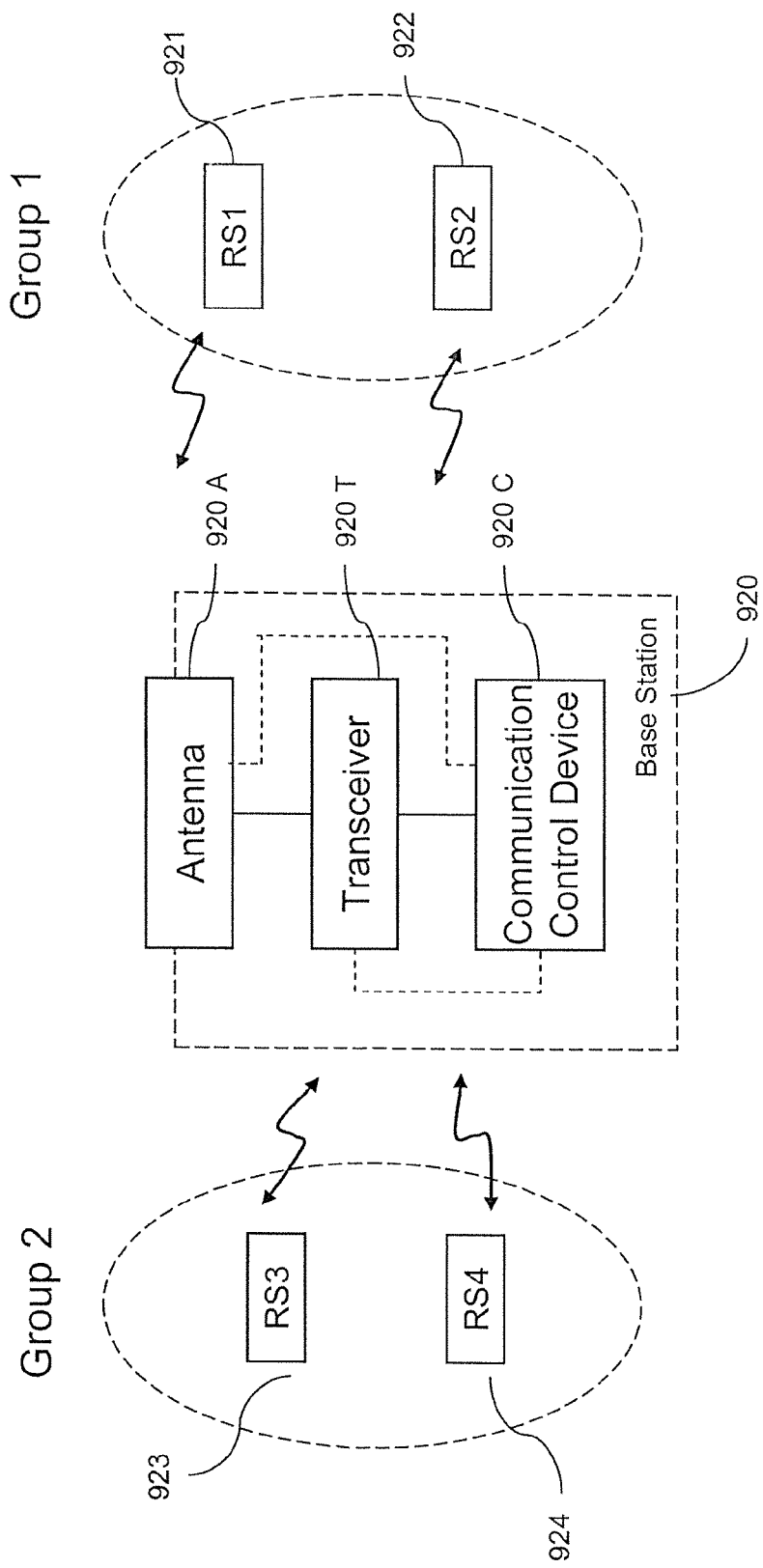
FIG. 9A is an exemplary functional diagram illustrating a wireless communication system consistent with certain disclosed embodiments.

FIG. 9A is an exemplary functional diagram illustrating a wireless communication system consistent with certain disclosed embodiments. Referring to FIG. 9A, a wireless communication system may include two or more groups of relay stations and one or more base stations, such as relay stations 921 (RS1) and 922 (RS2) in Group 1, relay stations 923 (RS3) and 924 (RS4) in Group 2, and base station 920. The first group of relay stations (Group 1) may be configured to receive and relay a first group of wireless communication signals, and the second group of relay stations (Group 2) may be configured to receive and relay a second group of wireless communication signals. The relay stations in the first and second groups may be divided into groups based on one or more considerations, such as potential interference among the stations within the same cell and potential interference from other serving stations in the same cell, such as those using the same co-channel. A base station, such as base station 920, in the wireless communication system may include one or more antennas, such as the antenna 920A, for signal communications and a communication control device, such as the communication control device 920C, which may be coupled directly or indirectly with antenna 920A. Base station 920 may be configured to communicate with the first group of relay stations and the second group of relay stations, and communication control device 920C is configured to control one or more transmission control parameters, such as the signal transmission power of one or more antennas 920A and the signal communication timing of one or more antennas 920A.

In some embodiments, communication control device 920C may be configured to divide a service period of one or more antennas into two or more phases and can vary the number of phases depending on the number of groups in the system. Communication control device 920C may enable the communication of signals directed toward or from the first group of relay stations in a first phase. Communication control device 920C may also enable the second group of relay stations to communicate signals with one or more user devices, one or more base stations, or both, during at least part of the first phase, independently from the signals directed toward or from the first group of relay stations. Communication control device 920C may also be configured (1) to enable communication of signals directed toward or from the second group of relay stations in a second phase and (2) to enable the first group of relay stations to communicate signals, during at least a part of the second phase, independently from the signals directed toward or from the second group of relay stations. Communication control device 920C may also determine an order of serving different relay station groups within the service period. Antenna(s) 920A of base station(s) 920 may be configured to be directional and may be configured to serve relay stations within a directional or pointed area.

Relay stations RS1-RS4 may be arranged in various ways. For example, one or more of the relay stations in the first and second groups may be deployed to have a virtual line of sight of one or more base stations. The relay stations, depending on the number, interference among them, and other factors, may also be divided into more groups, such as three or more groups. The relay stations are usually, but not required to, configured to serve user devices not within a virtual line of sight of the base station(s) or configured to serve user devices to provide improved link quality, improved overall link spectral efficiency, or both when communicating through the relay station(s). In comparison, one or more of those qualities might not be as desirable when the user devices communicate directly with the base station(s) without going through the relay station(s).

In one embodiment, base station(s) 920, in addition to antenna(s) 920A and communication control device 920C, may have a transceiver device 920T configured to communicate with the first group of relay stations (Group 1) and the second group of relay stations (Group 2). In one embodiment, the relay stations in the first and second groups are divided into groups based on at least a potential interference or interference among at least some of the relay stations.

In some embodiments, the wireless communication system may have three or more groups of relay stations. In the case of three groups, the third group of relay stations may be configured to receive and relay a third group of wireless communication signals. The third group of relay stations and the first or second group of relay stations may have an overlap in their coverage areas. As discussed above, the different groups of relay stations may be divided into groups based on a potential interference among some or all of the relay stations or based on other factors. In one embodiment, the communication control device may be further configured (1) to enable communication of signals directed toward or from the third group of relay stations in a third phase; and (2) to enable one or both of the first and the second groups of relay stations to communicate signals with at least one base station, during at least a part of the third phase, independently from the signals directed toward or from the third group of relay stations.

Consistent with the system above, a wireless communication method may be provided in one embodiment. The method may include: establishing communications between at least one base station and a plurality of relay stations being configured to receive and relay wireless communication signals from at least one base station; dividing the relay stations in a first and second group based on at least a potential interference among at least some of the relay stations; dividing a service period of at least one antenna of at least one base station into multiple phases; and controlling at least one of (1) signal transmission power of at least one antenna of at least one base station and (2) signal communication timing of at least one antenna to enable communication of signals directed toward or from the first group of relay stations in a first phase. The control may also enable the second group of relay stations to communicate signals, during at least a part of the first phase, independently from the signals directed toward or from the first group of relay stations.

In one embodiment, the dividing of the relay stations may be based on one or both of (1) potential interference among at least some of the relay stations within the same cell; and (2) potential interference from other serving stations in at least one co-channel cell. In anther embodiment, the controlling operation may include controlling one or both of the factors listed above (1) to enable communication of signals directed toward or from the second group of relay stations in a second phase; and (2) to enable the first group of relay stations to communicate signals with the at least one base station, during the at least a part of the second phase, independently from the signals directed toward or from the second group of relay stations. Similarly, the controlling operation may further include controlling one or both of the factors listed above (1) to enable communication of signals directed toward or from the third group of relay stations in a third phase; and (2) to enable one or both of the first and the second groups of relay stations to communicate signals with at least one base station, during at least a part of the third phase, independently from the signals directed toward or from the third group of relay stations.

In additional embodiments, if the number of groups is N, a service period of a complete transmissions scheduling may be divided into N phases, and each phase may include one or more downlink transmission, one or more uplink transmissions, or both. The service period may be the length of a frame, and the frame may be divided into N phases. Also, the service period may be the length of a plurality of frames and the frames as a group may be divided into N phases. The downlink and the uplink transmissions during various phases in a frame may be arranged according to the definition of a frame. For example, the downlink and the uplink transmissions within various phases or each phase may alternate, or the downlink transmission of various phases may be arranged before the uplink transmissions. With this disclosure, persons skilled in the art will understand that various arrangements for the downlink and uplink transmissions may be implemented depending on the applications or other considerations. In one example, relay stations 801 to 804 may be divided into 2 groups and thus a service period may be divided into 2 phases.

Figure 9B:
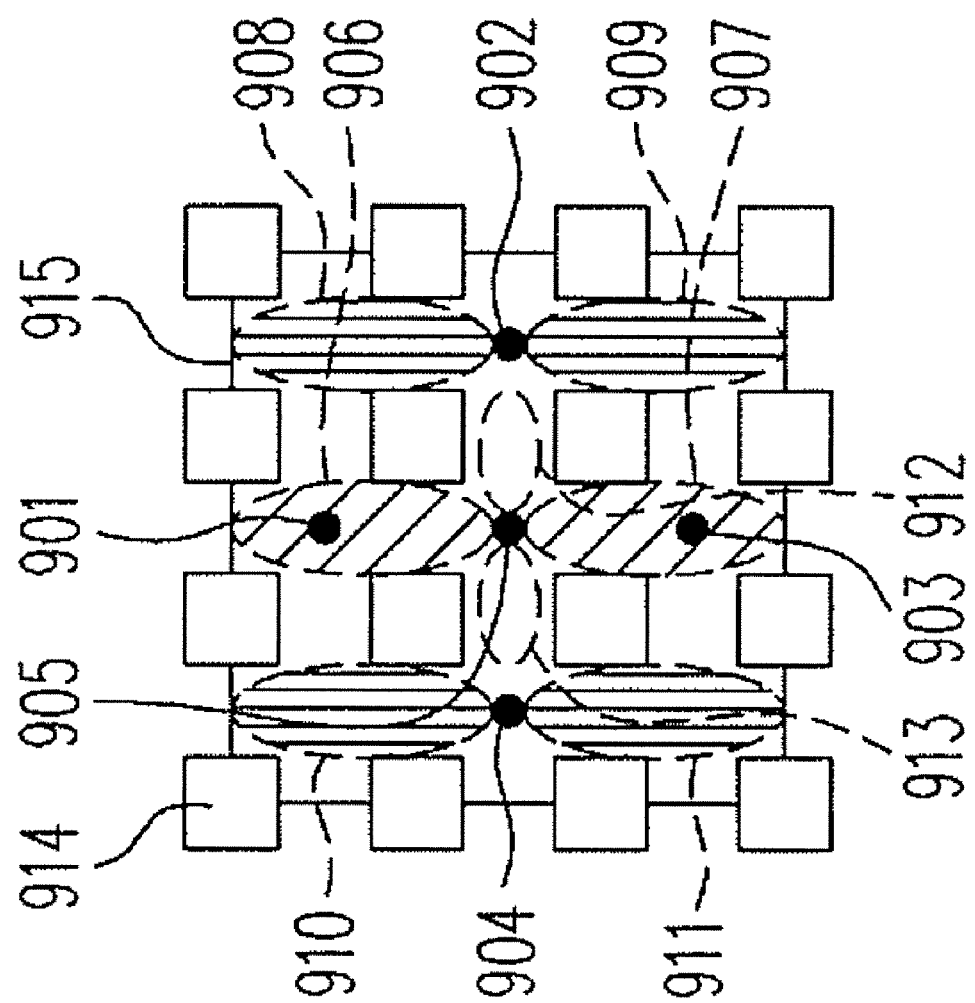
FIG. 9B is an exemplary diagram illustrating a first phase of transmission scheduling for an uplink transmission and a downlink transmission within a single cell consistent with certain disclosed embodiments.

FIG. 9B is a diagram illustrating a first phase of a transmission scheduling for an uplink transmission and a downlink transmission within a single cell consistent with certain disclosed embodiments. Referring to FIG. 9B, during the first phase, base station 905 may serve one or both of (1) relay stations 901 and 903, both of which are grouped as group A; and (2) and users within LOS 906 and 907 of base station 905, which may be in the same direction as that of group A. Base station 905 may serve group A through, for example, a downlink transmission, an uplink transmission, or both.

In one embodiment, the downlink transmission refers to a transmission in which base station 905 transmits data, such as to relay stations 901 and 903 in group A and to the users within LOS 906 and 907 of base station 905 in the direction of group A. During the same phase, relay station 902 in a second group, group B, may relay the data received from base station 905 during the previous phase to users within an NLOS of base station 905 and within LOS 908 and 909 of group B, and relay station 904 in group B may relay the data received from base station 905 during the previous phase to the users within the NLOS of base station 905 and within LOS 910 and 911 of group B. Moreover, depending on applications, base station 905 may be configured to serve users within service areas 912 and 913 around base station 905 and in the direction of group B with appropriate power control at a relatively low transmission power during the first phase. A lower transmission power may reduce the interference in relay stations 901 to 904 caused by base station 905 to a level lower than a tolerable threshold.

In one embodiment, the uplink transmission refers to transmission in which base station 905 receives data transmission, such as from relay stations 901 and 903 in group A and the users within LOS 906 and 907 of base station 905 in the direction of group A transmit data. During the same phase, relay station 902 in group B may receive uplink data from users within the areas 908 and 909, and relay station 904 in group B may receive uplink data from the users within the areas 910 and 911. Moreover, depending on applications, the users within the service areas 912 and 913 around base station 905 and in the direction of group B may be allowed to transmit uplink data to base station 905 during the first phase.

Figure 10:
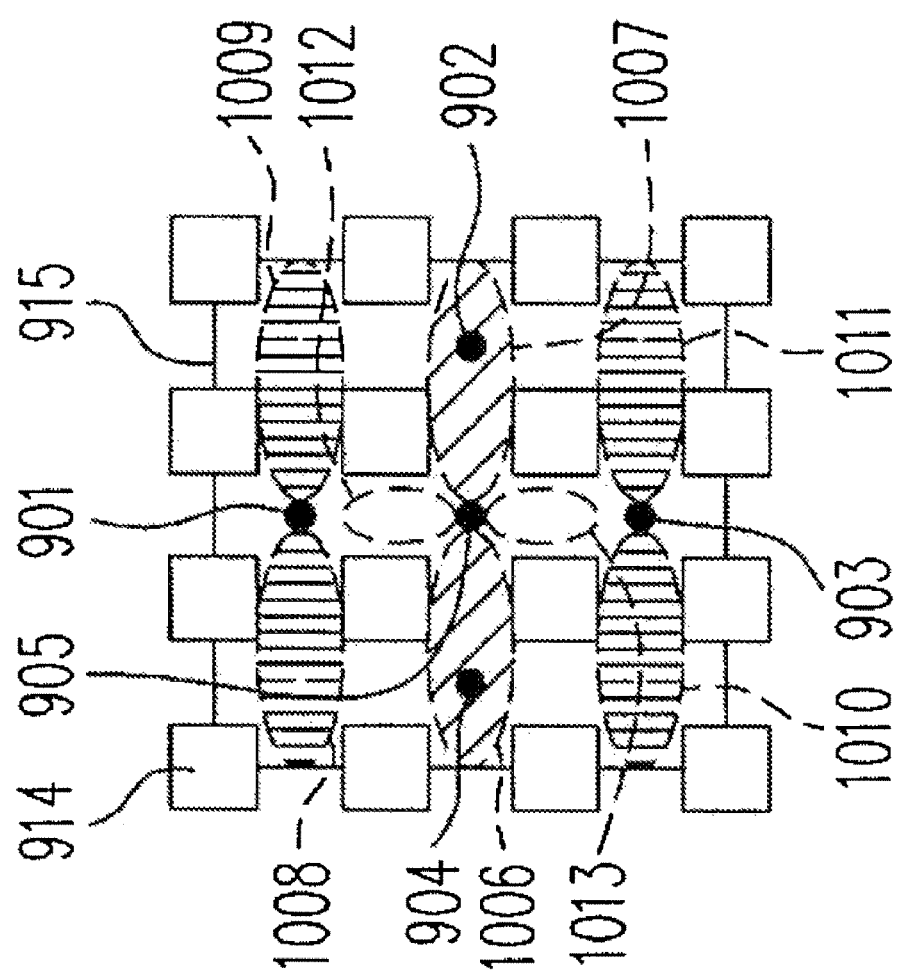
FIG. 10 is an exemplary diagram illustrating a second phase of transmission scheduling for an uplink transmission and a downlink transmission within a single cell consistent with certain disclosed embodiments.

FIG. 10 is a diagram illustrating a second phase of transmission scheduling for an uplink transmission and a downlink transmission within a single cell consistent with certain disclosed embodiments. Referring to FIG. 10, during the second phase, base station 905 may serve group B and users within LOS 1006 and 1007 of base station 905 in the direction of group B. Base station 905 may serve group B through, for example, a downlink transmission and/or an uplink transmission.

In one embodiment, the downlink transmission during the second phase may refer to a transmission in which base station 905 transmits data to relay stations 902 and 904 in group B and users within LOS 1006 and 1007 of base station 905 in the direction of group B. During the same phase, relay stations 901 and 903 in group A may respectively relay data received from base station 905 during the previous phase to users within the NLOS of base station 905 and within LOS 1008 to 1009 and 1010 to 1011 of group A. Moreover, base station 905 may be configured to serve users in service areas 1012 and 1013 around base station 905 and in the direction of group A with appropriate power control at a relatively low transmission power during the second phase.

In one embodiment, the uplink transmission during the second phase refers to a transmission in which relay stations 902 and 904 in group B and users within LOS 1006 and 1007 of base station 905 in the direction of group B may transmit data to base station 905. During the same phase, relay station 901 in group A may receive uplink data from users in areas 1008 and 1009, and relay station 903 in group A may receive uplink data from users within areas 1010 and 1011. Moreover, users within areas 1012 and 1013 may be allowed to transmit uplink data to base station 905 during the second phase.

Figure 11:
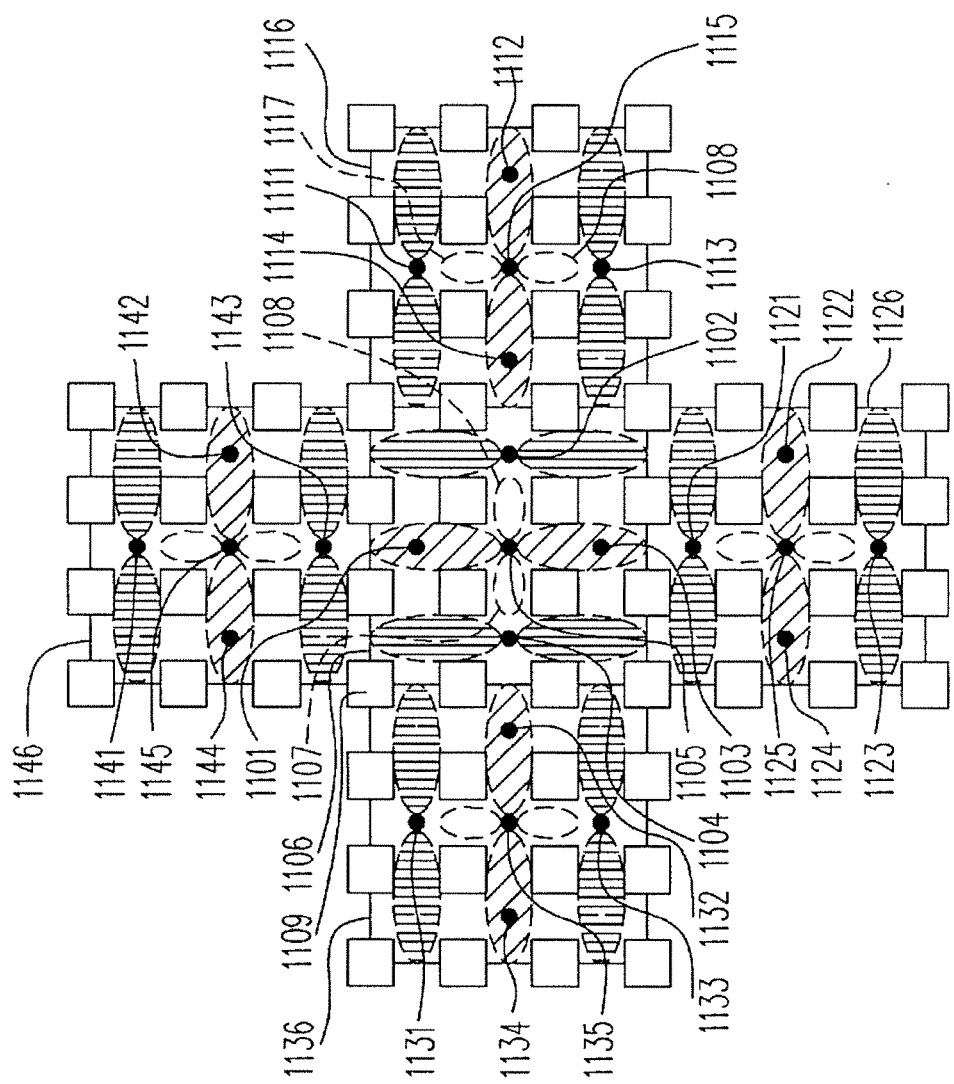
FIG. 11 is an exemplary diagram illustrating a first phase of transmission scheduling for an uplink transmission and a downlink transmission between adjacent cells consistent with certain disclosed embodiments.

FIG. 11 is a diagram illustrating a first phase of transmission scheduling for an uplink transmission and a downlink transmission between adjacent cells consistent with certain disclosed embodiments. Referring to FIG. 11, in a multi-cell structure, service orders of transmission scheduling of two adjacent cells may be varied based on one or more factors such as the interference between cells and the signal quality of users at the cell boundary. The cells adjacent to a cell A (with a coverage area 1106) in four directions include a cell B (with a coverage area 1116), a cell C (with a coverage area 1126), a cell D (with a coverage area 1136) and a cell E (with a coverage area 1146). Base station 1115 and relay stations 1111 to 1114 may be placed in coverage area 1116 of cell B; base station 1125 and relay stations 1121 to 1124 may be disposed in coverage area 1126 of cell C; base station 1135 and relay stations 1131 to 1134 may be disposed in coverage area 1136 of cell D; and base station 1145 and relay stations 1141 to 1144 may be disposed in coverage area 1146 of cell E. In one example, the service orders of cells B to E may be the same. Accordingly, for ease of illustration, only cell B will be described below as an example.

Within coverage area 1106 of cell A, when base station 1105 serves relay stations 1101 and 1103 in group A and users within the LOS of base station 1105 in the direction of group A (such as the group that performs single cell transmission scheduling), the adjacent base stations in four directions, such as base station 1115 in coverage area 1116 of cell B, may serve relay stations 1112 and 1114 in group B and users in the LOS of base station 1115 in the direction of group B (such as the group that performs single cell transmission scheduling). Meanwhile, relay stations 1102 and 1104 in group B within coverage area 1106 of cell A and relay stations 1111 and 1113 in group A within coverage area 1116 of cell B may perform data transmission, such as data transmission to serve users. In another example, base stations 1105 and 1115 may transmit data respectively to users within areas 1107 to 1108 and 1117 to 1118 at a relatively low transmission power.

Figure 12:
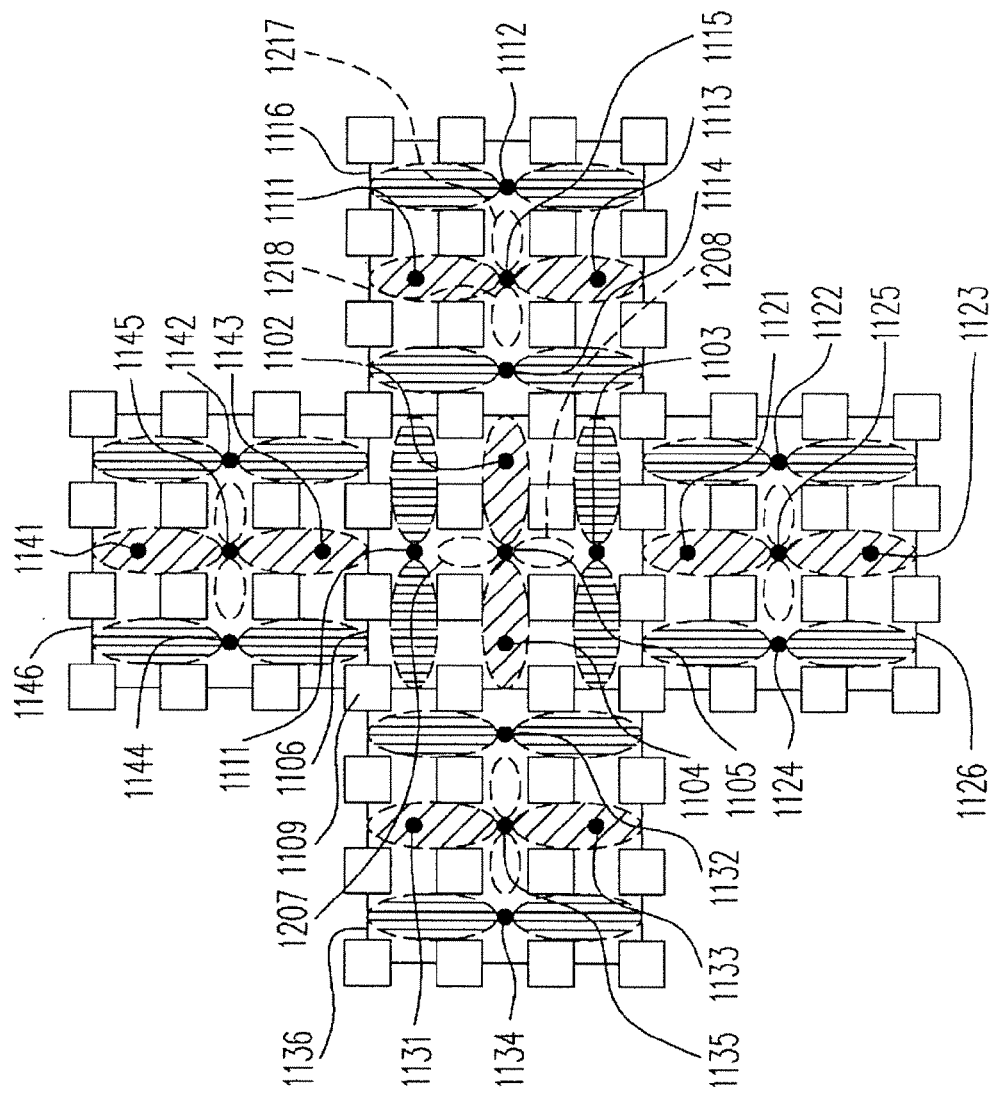
FIG. 12 is an exemplary diagram illustrating a second phase of transmission scheduling for an uplink transmission and a downlink transmission between adjacent cells consistent with certain disclosed embodiments.

FIG. 12 is a diagram illustrating a second phase of a transmission scheduling for an uplink transmission and a downlink transmission between adjacent cells consistent with certain disclosed embodiments. Referring to FIG. 12, within coverage area 1106 of cell A, when base station 1105 serves relay stations 1102 and 1104 in group B and users within the LOS of base station 1105 in the direction of group B, the adjacent base stations in four directions, such as base station 1115 in coverage area 1116 of cell B, may serve relay stations 1111 and 1113 in group A and users within the LOS of base station 1115 in the direction of group A. Meanwhile, relay stations 1101 and 1103 in group A within coverage area 1106 of cell A and relay stations 1112 and 1114 in group B within coverage area 1116 of cell B may perform data transmission, such as data transmission to serve users. In another embodiment, base stations 1105 and 1115 may transmit data to users respectively within areas 1207 to 1208 and 1217 to 1218 at a relatively low transmission power.

Figure 13:
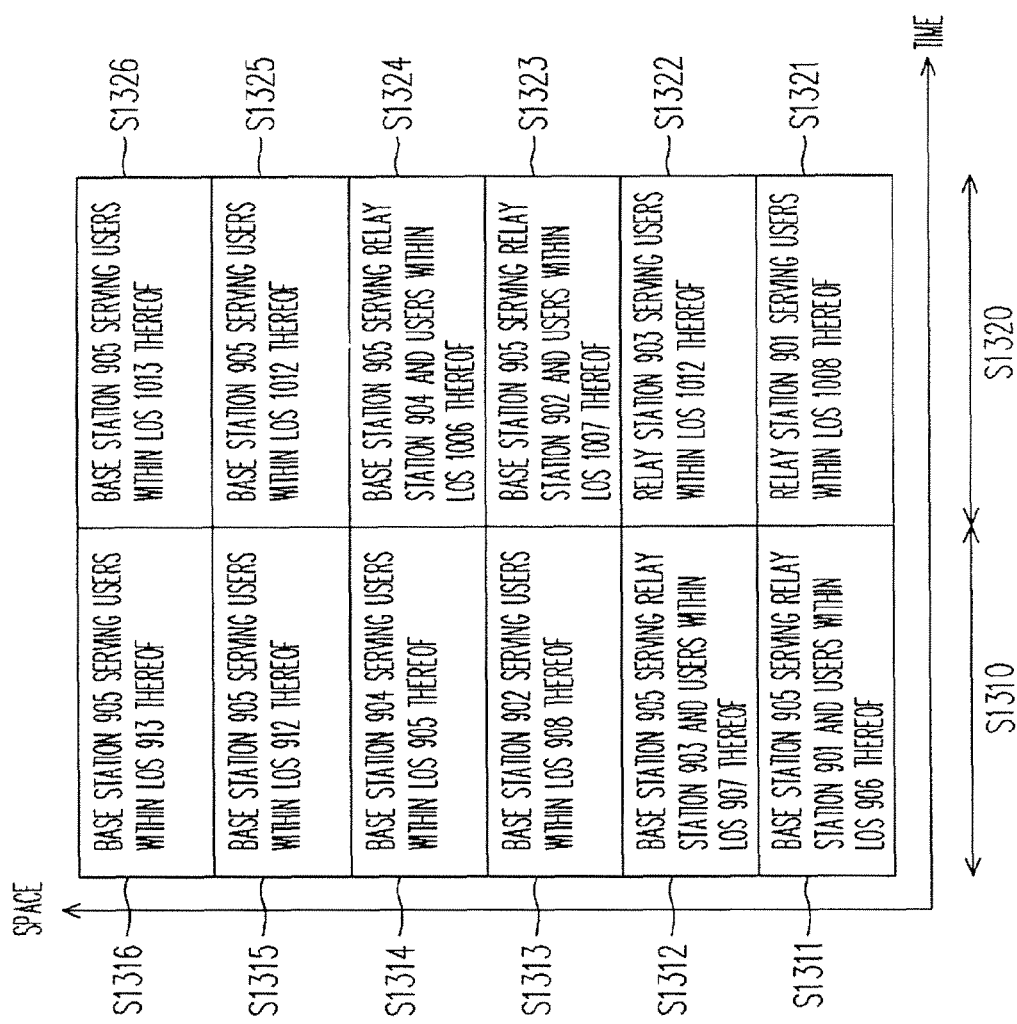
FIG. 13 is an exemplary diagram illustrating operations of transmission scheduling during various phases of a single cell consistent with certain disclosed embodiments.

FIG. 13 is a diagram illustrating operations of a transmission scheduling during various phases of a single cell consistent with certain disclosed embodiments. Referring to FIG. 13 and also FIGS. 9 and 10, operations S1311 and S1312 during a first phase S1310 of a single cell transmission scheduling may include the operation by which base station 905 serves relay stations 901 and 903 in group A and users within areas 906 and 907. During the same phase, operations S1313 and S1314 of a single cell transmission scheduling S1310 may include an operation by which relay stations 902 and 904 in group B respectively serve users within areas 908 to 909 and areas 910 to 911. Moreover, operations S1315 and S1316 during the first phase S1310 of a single cell transmission scheduling may include the operation by which the base station serves users within areas 912 and 913.

Operations S1323 and S1324 during the second phase S1320 of a single cell transmission scheduling may include an operation in which base station 905 serves relay stations 902 and 904 in group B and users within areas 1006 and 1007. During the same phase, operations S1321 and S1322 of the single cell transmission scheduling may include an operation by which relay stations 901 and 903 in group A respectively serve users within areas 1008 to 1009 and areas 1010 to 1011. Moreover, operations S1325 and S1326 during the second phase S1320 of a single cell transmission scheduling may include an operation by which base station 905 serves users within areas 1012 and 1013.

In a multi-cell structure, service orders of transmission scheduling in the frame structures of two adjacent cells may be varied based on one or more considerations such as the interference between cells and the signal quality of users at the cell boundary.

Table 1 below illustrates exemplary comparisons between an embodiment and the conventional technique in a wireless communication system. In Table 1, the "frequency reuse factor" refers to the ratio of (1) usable frequency of a single cell to (2) usable frequency of the system. In one example, because a base station is the only serving station connected to the backhaul network in a cell, the "effective frame" may refer to the number of frames a base station receives and sends during a service period. The "capacity gain" may be the gain obtained based on the "frequency reuse factor" and the "effective frame" factors. An embodiment is compared to the second setup under the WINNER's design illustrated above with all serving stations equipped with omni-directional antennas of the same coverage areas. Design 1 is a design example in which the base station does not serve users around the base station at a relatively low transmission power, and Design 2 is a design example in which the base station serves users around the base station with appropriate power control at a relatively low transmission power.

In the second setup under the WINNER's design, data may be transmitted between adjacent cells at different frequencies to prevent interference between adjacent cells. Accordingly, the "frequency reuse factor" is ½. In this design, 6 phases are needed to complete a downlink transmission, or an uplink transmission. The actual number of frames transmitted by the base station is 4, and the "effective frame" is, therefore, ⅔ (=4/6).

Under Design 1, data may be transmitted at the same frequency between adjacent cells. Accordingly, the "frequency reuse factor" is 1. During the two phases of a complete downlink transmission, the base station may transmit 4 frames, resulting in an "effective frame" of 2. The uplink transmission is similar to the downlink transmission. Furthermore, assuming that the "capacity gain" of the prior art is 1, Design 1 may have a factor of more than 2 in the usage of the frequency spectrum. The "effective frame" of Design 1 can be 3 times that of in the prior art, resulting in a "capacity gain" of "6."

Under Design 2, because data may be transmitted at the same frequency between adjacent cells, the "frequency reuse factor" is 1. During the two phases of a complete downlink transmission, the base station may transmit 8 frames, resulting in an "effective frame" of 4. The uplink transmission may be similar to the downlink transmission. Furthermore, assuming the "capacity gain" of the prior art is 1, Design 2 may have a factor of more than 2 in the usage of frequency spectrum. The "effective frames" of the first design of the present invention may be 6 times that of the prior art, resulting in a "capacity gain" of "12."

In the embodiments disclosed here, the service areas of the base station and relay stations in a wireless multi-hop relay communication system may be divided into a number of regions because of the shadowing effect of the surroundings. The intensity of an interference level may be observed or determined by one or more of relay stations and provided to the base station. The base station may rely on the information to divide the relay stations into different groups so that the base station may serve the different groups sequentially. Because of desirable isolation from interference signals due to shadowing effects or other reasons, the same radio resources may be reused and scheduled for different relay stations, thereby improving the system capacity without increasing signaling interference. In a multi-cell structure, universal frequency reuse may be achieved by varying the service orders or transmission scheduling of adjacent cells. Through the mechanism of grouping and variation in transmission scheduling, interference within a single cell and between adjacent cells may be prevented or reduced, and high spectrum efficiency may be achieved through aggressive radio frequency reuse. Furthermore, in the transmission scheduling structure provided in the embodiments, the base station may transmit data during various phases, and the effective cell/system capacity may be improved considerably.

If relay stations one and one or more base stations are jointly considered in an environment that has been set up, one or more of the interference detection, relay station grouping, and scheduling mechanisms discussed above may be implemented to decide the transmissions sequences among base stations and relay stations. If the base station is already setup in a given environment and relay stations are being added, one or more of interference detection, relay station grouping and scheduling mechanisms as discussed above may be used to determine the transmissions or transmission schedule among all devices without modifying the original cell planning, such as the location(s) of the base station(s). The disclosed embodiments may be implemented within any network configuration utilizing wireless technology, protocols, or stan-

TABLE 1

| | Frequency reuse factor | Effective frames | Capacity gain |
|---|---|---|---|
| The second setup in the WINNER's design with all serving stations equipped with omni-directional antennas | ½ | ⅔ | 1 |
| Design 1 in an embodiment | 1 | 2 | 6 |
| Design 2 in another embodiment | 1 | 4 | 12 | dards. In this manner, the disclosed embodiments may enable the system to more effectively utilize resources. In particular, the disclosed embodiments may improve the efficiency in the use of wireless communication frequency spectrums or may reduce undesirable interference.

It will be apparent to those skilled in the art that various modifications and variations can be made to the embodiments disclosed here. The disclosed embodiments are merely exemplary, and the scope of the disclosed embodiments is provided with the following claims. Additionally, in describing the embodiments, the specification may have presented the exemplary methods or processes in a particular sequence of steps. However, to the extent that the methods or processes do not rely on the particular order of steps set forth herein, the described or claimed methods or processes are not limited to the particular sequence of steps described.

We claim:

1. A wireless communication system, the system comprising:
    a first group of relay stations being configured to receive and relay a first group of wireless communication signals;
    a second group of relay stations being configured to receive and relay a second group of wireless communication signals, the relay stations in the first and second groups being divided into groups based on at least a potential interference among the relay stations within the same cell and from other serving stations in at least one co-channel cell;
    at least one base station being configured to communicate with the first group of relay stations and the second group of relay stations, at least one base station comprising:
    at least one antenna for signal communications; and
    a communication control device coupled with the at least one antenna, the communication control device being configured to control at least one of (1) a signal transmission power of and (2) a signal communication timing of at least one antenna,
    wherein the communication control device being configured to divide a service period of the at least one antenna into the at least two phases, to enable communication of signals directed toward or from the first group of relay stations in a first phase, and to enable the second group of relay stations to communicate signals with the at least one of the at least one user device and the at least one base station, during at least a part of the first phase, independently from the signals directed toward or from the first group of relay stations.

2. The system of claim 1, wherein at least one of the relay stations in the first and second groups is deployed to have a virtual line of sight of one of the at least one base station.

3. The system of claim 1, wherein at least one of the relay stations in the first and second groups is configured to serve user devices not within a virtual line of sight of the at least one base stations.

4. The system of claim 1, wherein at least one of the relay stations in the first and second groups is configured to serve user devices having at least one of (1) an improved link quality when communicating through the relay station and (2) an improved overall link spectral efficiency when communicating through the relay station.

5. The system of claim 1, wherein the communication control device of the at least one base station determines an order of serving different relay station groups within the service period.

6. The system of claim 1, wherein the at least one antenna is directional and is configured to serve relay stations within a directional area.

7. The system of claim 1, wherein the communication control device is further configured to enable communication of signals directed toward or from the second group of relay stations in a second phase, and to enable the first group of relay stations to communicate signals, during at least a part of the second phase, independently from the signals directed toward or from the second group of relay stations.

8. A wireless communication system, the system comprising:
    at least one base station being configured to communicate with at least one user device through at least one relay station, the at least one base station comprising:
    at least one antenna for signal communications;
    a transceiver device coupled with the at least one antenna, the transceiver device being configured to communicate with a first group of relay stations being configured to receive and relay a first group of wireless communication signals from the at least one base station and a second group of relay stations being configured to receive and relay a second group of wireless communication
    signals from the at least one base station, the relay stations in the first and second groups being divided into groups based on at least a potential interference among at least some of the relay stations; and
    a communication control device coupled with the at least one antenna and the transceiver device, the communication control device being configured to control the at least one of (1) signal transmission power of at least one antenna and (2) signal communication timing of at the at least one antenna,
    wherein the communication control device being configured to divide a service period of the at least one antenna into multiple phases, to enable communication of signals directed toward or from the first group of relay stations in a first phase, and to enable the second group of relay stations to communicate signals, during at least a part of the first phase, independently from the signals directed toward or from the first group of relay stations.

9. The system of claim 8, the relay stations in the first and second groups are divided into groups based on at least one of the (1) potential interference among at least some of the relay stations within the same cell; and (2) potential interference from other serving station in at least one co-channel cell.

10. The system of claim 8, wherein the communication control device is further configured to enable communication of signals directed toward or from the second group of relay stations in a second phase, and to enable the first group of relay stations to communicate signals with the at least one base station, during at least a part of the second phase, independently from the signals directed toward or from the second group of relay stations.

11. The system of claim 8, further comprising:
    a third group of relay stations being configured to receive and relay a third group of wireless communication signals, the third group of relay stations and the second group of relay stations having an overlap in a coverage area of the third group of relay stations and a coverage area of the second group of relay stations, the relay stations in the third and second groups being divided into groups based on at least a potential interference among at least some of the relay stations,
    wherein the communication control device is further configured to enable communication of signals directed toward or from the third group of relay stations in a third phase, and to enable at least one of the first and the second groups of relay stations to communicate signals with the at least one base station, during at least a part of the third phase, independently from the signals directed toward or from the third group of relay stations.

12. The system of claim 8, wherein at least one of the relay stations in the first and second groups is deployed to have a virtual line of sight of one of the at least one base station.

13. The system of claim 8, wherein at least one of the relay stations in the first and second groups is configured to serve user devices not within a virtual line of sight of the at least one base station.

14. The system of claim 8, wherein at least one of the relay stations in the first and second groups is configured to serve user devices having at least one of (1) an improved link quality when communicating through the relay station and (2) an improved overall link spectral efficiency when communicating through the relay station.

15. The system of claim 8, wherein the communication control device of the at least one base station determines an order of serving different relay station groups within the service period.

16. The system of claim 8, wherein the at least one antenna is directional and is configured to serve relay stations within a directional area.

17. A wireless communication method comprising:
establishing communications between at least one base station and a plurality of relay stations being configured to receive and relay wireless communication signals from the at least one base station;
dividing the relay stations in a first and a second group into groups based on at least a potential interference among at least some of the relay stations, the first group of relay stations being configured to receive and relay a first group of wireless communication signals from the at least one base station, the second group of relay stations being configured to receive and relay a second group of wireless communication signals from the at least one base station, the first group of relay stations and the second group of relay stations having an overlap in a coverage area of the first group of relay stations and a coverage area of the second group of relay stations,
dividing a service period of at least one antenna of at least one base station into multiple phases; and
controlling at least one of (1) signal transmission power of at least one antenna of the at least one base station and (2) signal communication timing of the at least one antenna to enable communication of signals directed toward or from the first group of relay stations in a first phase, and to enable the second group of relay stations to communicate signals, during at least a part of the first phase, independently from the signals directed toward or from the first group of relay stations.

18. The method of claim 17, wherein dividing the relay stations comprises dividing the relay stations in the first and second groups into groups based on at least one of (1) the potential interference among at least some of the relay stations within the same cell; and (2) the potential interference from other serving stations in at least one co-channel cell.

19. The method of claim 17, further comprising controlling at least (1) the signal transmission power and (2) the signal communication timing to enable communication of signals directed toward or from the second group of relay stations in a second phase, and to enable the first group of relay stations to communicate signals with the at least one base station, during at least a part of the second phase, independently from the signals directed toward or from the second group of relay stations.

20. The method of claim 17, further comprising controlling at least one of (1) the signal transmission power and (2) the signal communication timing to enable communication of signals directed toward or from the third group of relay stations in a third phase, and to enable at least one of the first and the second groups of relay stations to communicate signals with the at least one base station, during at least a part of the third phase, independently from the signals directed toward or from the third group of relay stations.

* * * * *